Feb. 1, 1949. L. BIHALY 2,460,674
SHAPED FABRIC ARTICLE
Filed Feb. 13, 1946 2 Sheets-Sheet 1

Inventor
L. Bihaly
By Robert Cobb
Attorneys

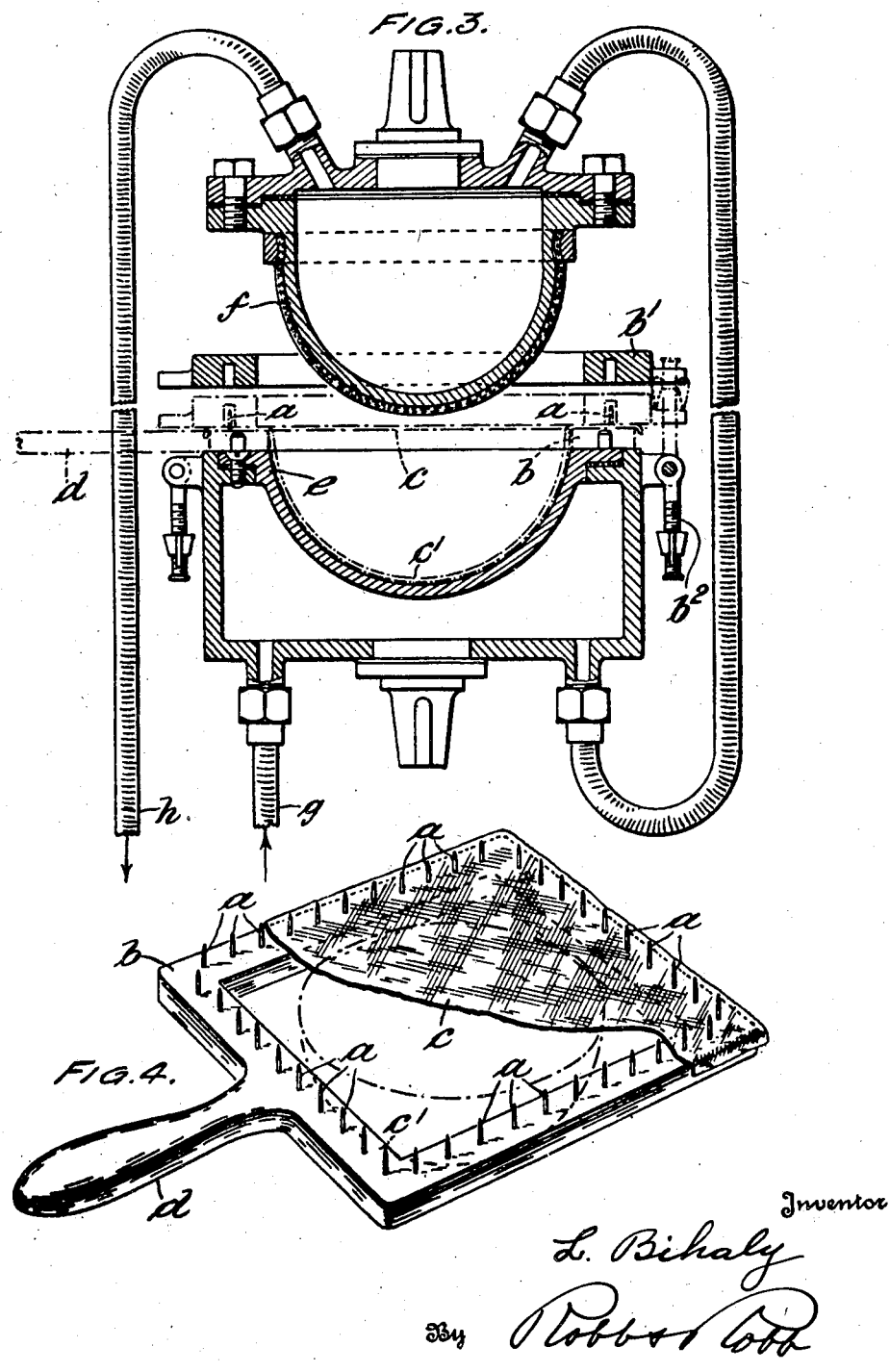

Patented Feb. 1, 1949

2,460,674

UNITED STATES PATENT OFFICE 2,460,674

SHAPED FABRIC ARTICLE

Lajos Bihaly, London, England, assignor to Trubenised Limited, London, England

Application February 13, 1946, Serial No. 647,305
In Great Britain February 1, 1943

Section 1, Public Law 690, August 8, 1946
Patent expires February 1, 1963

9 Claims. (Cl. 2—42)

This invention relates to shaped fabric articles produced by forming material comprising elements of a thermoplastic material to a desired shape and is particularly concerned with breast cups for brassieres.

The main desiderata for such articles are that they should be washable, reasonably permeable to air and moisture and that they should maintain their shape without being unduly rigid and it is the object of the present invention to provide shaped articles of this type which meet these requirements and to provide a method by means of which they can be expeditiously and economically manufactured.

Numerous methods of accomplishing this object have been suggested based on the broad idea of stretching a fabric composed of thermoplastic and non-thermoplastic elements to the desired shape as in a mould and securing the shape permanently by the application of heat and pressure.

It has been suggested to employ in such processes woven or knitted fabrics comprising compound strands of thermoplastic and non-thermoplastic material made by intertwining or spinning together the two components, and to form shaped textile articles by assembling and amalgamating a plurality of woven or knitted fabrics, one of which contains yarns of or containing a thermoplastic material.

It has also been proposed to employ as the thermoplastic material cellulose acetate or other cellulose derivative, to assist the union of the threads by applying thereto a solvent for the thermoplastic material, to employ yarns containing thermoplastic materials which have been plasticized, and also to shape the articles by stretching the material over the male part of a moulding device and permanently establish the shape of the article by injecting steam or solvent vapours into mould cavities.

The present invention differs from all the prior proposals with which we are familiar in that the material we employ is essentially knitted from a double composite strand. That is to say the knitting is effected by simultaneously knitting double strands, one of which is composed of thermoplastic material and the other of non-thermoplastic material, the two strands lying alongside each other, but being separate and capable of relative movement one to the other.

Such material has the advantage that it can be quickly stretched to the three dimensional shape without the aid of heat and without any danger of fracturing the strands, the shape can then be permanently fixed by the application of pressure accompanied by heat and the use of solvents or wetting agents for a plasticizer where necessary depending of course on the particular nature of the thermoplastic material employed.

The invention therefore consists of breast cups for brassieres and like three dimensional articles composed of fabric consisting of thermoplastic and non-thermoplastic elements stretched to the desired shape and fixed in the stretched shape by the application of heat and pressure characterised in that the material employed is knitted from a double composite strand which consists of separate strands lying alongside each other and knitted together simultaneously, one of the strands being of thermoplastic material and the other of non-thermoplastic material, and is such that it can be stretched to the desired three dimensional shape without the aid of heat and then caused to maintain said desired shape permanently by treatment to render the thermoplastic component of the double strands adhesive followed by pressure accompanied by heat, if necessary, causing the thermoplastic and non-thermoplastic strands of the material to be fused together at positions where the loops of the stretched knitting cross.

The invention further comprises the construction of such three dimensional articles wherein the stretchable composite material is amalgamated with a substantially equally stretchable non-thermoplastic material and still further comprises the process by which such articles are made.

The non-thermoplastic threads may be of cotton, linen, regenerated cellulose of the viscose type, silk wool, or the like, and the thermoplastic threads may be of a cellulose derivative such as cellulose acetate.

In order that the invention may be more readily understood and carried into practice reference is hereby made to the accompanying drawings wherein—

Figure 3 is a diagrammatic section of apparatus suitable for carrying out the invention as applied to the manufacture of breast cups for a brassiere;

Figure 4 is a perspective view of an accessory device for use with the apparatus.

Figure 1:
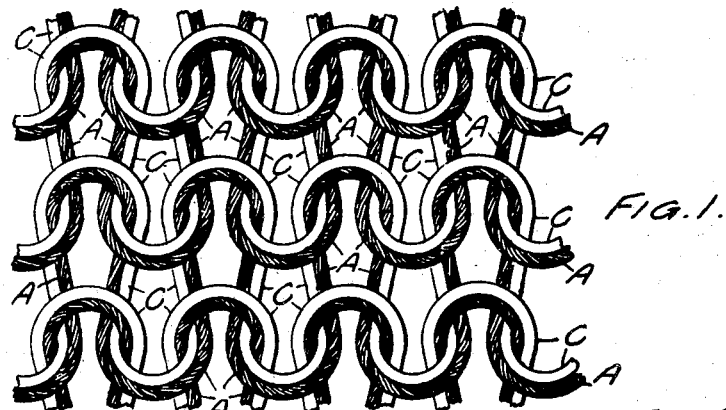
Figure 1 is a diagrammatic representation of a suitable structure for the knitted composite thermoplastic and non-thermoplastic material employed in the invention.

Referring to the drawings and particularly to Figure 1 which shows to an enlarged scale the structure of the composite material employed which is formed by knitting, in known manner, with double strands, one of the strands C being of cotton and the other A of a thermoplastic cellulose derivative.

The result of this is a stretchable material having cellulose derivative strands lying alongside cotton strands and crossing these at a multiplicity of points. This material may be knitted on a circular knitting machine. If the fabric is stretched the loops and their crossing points will slip relatively to each other, and the crossing points B will be in a position shown, for example, in the upper row of Figure 2.

Figure 2:
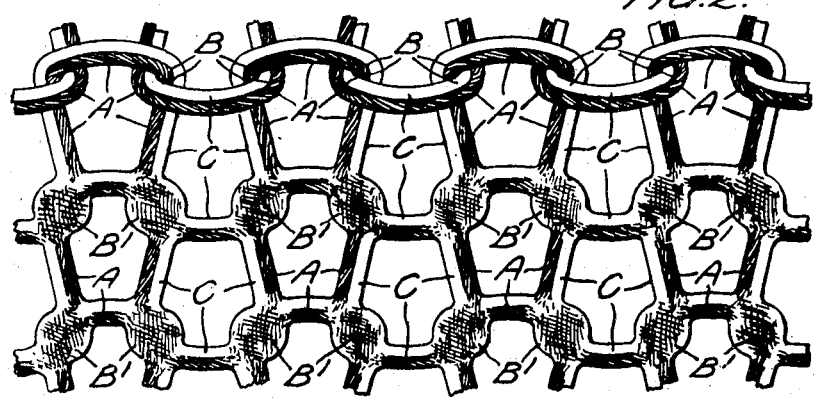
Figure 2 is a diagrammatic representation showing the structure of the material of Figure 1 after it has been stretched, the two lower rows in the figure indicating how after the completion of the fusion process the points of crossing of the loops become permanently fixed.

If, when in this stretched condition, fusion of the cellulose derivative is effected the crossing or interengaging points of the loops will become permanently fixed, as indicated at B in the two lower rows of Figure 2, and the material will permanently maintain the shape to which it was stretched before fusion.

The drawings, which are, of course, diagrammatic for the purposes of explanation only indicate the case where the material is stretched in its plane. Thus the displacement of the crossing points is indicated as being regular. The material can, however, and will according to the present invention be stretched out of its plane; that is to say by a force applied at right angles to its plane. Thus an article will be produced having a globular or three-dimensional shape which is permanently maintained by the fixing by fusion, of the multitudinous crossing points of the knitted loops in their displaced positions.

If this cellulose-derivative cotton fabric is of a sufficiently heavy knit it can be used for shaped articles without any addition. If, as is preferred, a sheet of this material with the cellulose derivative appearing on at least one of the surfaces is superimposed on a knitted or loosely woven backing of equally stretchable cotton, linen or other suitable fabric layer, or interposed between two such layers, stretched to a predetermined shape and then processed by treatment with a solvent followed by the application of pressure accompanied by heat in the manner described, for example, in the specification of Letters Patent No. 419,208, a substantially stiffened and permanently shaped but flexible product will result, the outer appearance of which is independent of the interlining and the backing. Such a product is of great advantage, for example in the case of a lady's brassière, with which, as before indicated, the invention is particularly concerned.

Figure 5:
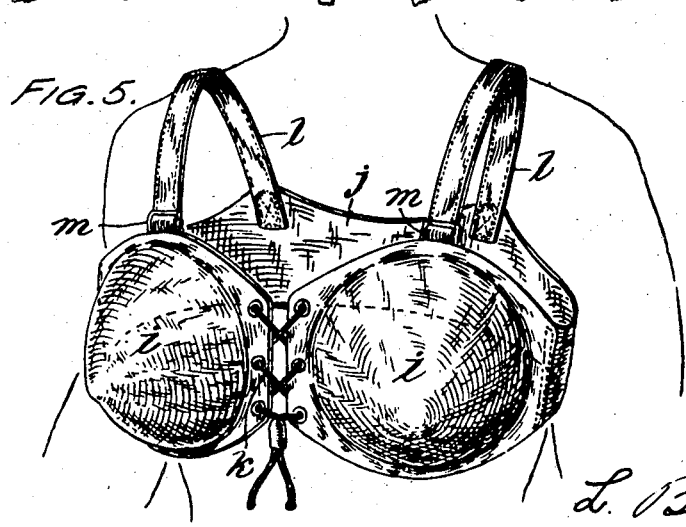
Figure 5 is a perspective view of a brassiere manufactured from shaped breast cups manufactured according to the invention.

In manufacturing such an article according to one method the two or three layers of material, at least one of which is the special knitted backing or lining material containing the cellulose derivative, are superimposed and arranged upon a frame, such as shown in Figure 4 for example by impaling on pins $a$ projecting from the frame border $b$ and the superimposed structure $c$ is then treated with a solvent for the cellulose derivative such as acetone where the cellulose derivative is cellulose acetate—or a wetting agent for the plasticizer such as alcohol if cellulose acetate material has been plasticized—for example, by dipping the frame with the material impaled upon it, in the solvent or wetting agent. The frame, provided with a suitable handle $d$ is then positioned on top of the female part $e$ (Figure 3) of a mould of the desired shape and may advantageously be clamped in position by the clamping frame $b1$ held in position by the swivel clamps $b2$. The advantage of this clamping is that it prevents any tendency of the fabric layer or layers to tear from the pins $a$. The male part $f$ of the mould, corresponding in contour with the female part $e$, is then moved towards register with the female part of the mould, stretching the stretchable fabric structure substantially to the mould shape. This can be effected quite quickly as no heating of the material is required to render it stretchable. On final closure of the mould the fabric structure will be subjected to pressure and heat, thus effecting the amalgamation of the plies and the fixing of the shape. The heating of the mould parts may be effected by means of steam introduced into internal recesses in the mould parts by way of flexible inlet and exhaust pipes $g$ and $h$ respectively. Two breast formations may, of course, be formed as an integral structure but in commercial use a number of these single formations of two or three different sizes can be mass-produced and brassières built up from them. One suitable arrangement is shown in Figure 5, which illustrates two breast elements $i$ made in the manner aforesaid, connected to a back support $j$ and having a front adjusting lacing $k$ and shoulder straps $l$ having adjusting buckles $m$.

What I claim and desire to secure by Letters Patent is:

1. Textile fabric for use in producing shaped articles of wearing apparel or the like, consisting of stretchable knitted fabric, each thread of which is composed of a strand of thermoplastic material and a separate parallel strand of non-thermoplastic material, said strands being independently shiftable relative to each other preliminary to and during shaping of said apparel, said stretchable fabric being laminated with a fabric of non-thermoplastic material having a factor of stretchability substantially equal to that of the composite strand knitted fabric, the laminae being deformed and held to shape by said thermoplastic material.

2. Breast cups for brassieres and like three-dimensional shaped articles, composed of stretchable knitted fabric, said fabric being knitted from a double composite thread consisting of a thermoplastic and a separate non-thermoplastic strand, each strand having the characteristic of being shiftable relative to the other prior to and during shaping, said fabric being deformed, and the component strands united together to maintain the deformation shape.

3. The process of producing shaped articles of wearing apparel, comprising the step of knitting a fabric from thread composed of separate stretchable thermoplastic and non-thermoplastic strands, each strand being shiftable relative to the other, stretching the fabric so knitted to shape and while in such shape treating the fabric to fuse the strands together at positions where the loops of the stretched knitting cross.

4. In a method of forming articles of wearing apparel, the steps of distorting to a three dimensional shape a substantially flat piece of knitted textile fabric formed of composite strands, each comprising a thermoplastic strand and a non-thermoplastic strand lying alongside said thermoplastic strand and separate from it, and fusing together the thermoplastic and non-thermoplastic strands to maintain said fabric substantially in the shape to which it has been distorted.

5. In a method of forming articles of wearing apparel, the steps of distorting to a three dimensional shape a sheet of fabric knitted from thread comprising separate strands of thermoplastic and non-thermoplastic materials, said strands being laid alongside one another and together forming a composite thread, treating said thermoplastic material to render it adhesive and subjecting said fabric to pressure while it is held in the three dimensional shape to fuse said composite thread strands together at their points of crossing.

6. In a method of forming an article of wearing apparel, such as a breast cup for a brassiere, the steps of superimposing a stretchable fabric knitted from thread of double strands, one of such strands being composed of thermoplastic material, and another of such strands being of non-thermoplastic material and arranged parallel to the first-mentioned strand, upon a stretchable fabric of non-thermoplastic material, stretching the superimposed fabrics to a three dimensional shape and fusing said thermoplastic material to unite the superimposed fabrics and permanently maintain them in their stretched shape.

7. A process of manufacturing breast cups for brassieres and shaped articles of wearing apparel according to claim 4, wherein the thermoplastic constituent of the fabric has been plasticized and the fabric is treated by a wetting agent for the plasticiser, and then subjecting said treated fabric to effect coalescence of the strands and maintenance of the shape.

8. A process of manufacturing breast cups for brassieres and shaped articles of wearing apparel according to claim 4, wherein the thermoplastic constituent of the fabric has been plasticised and the fabric is treated by a wetting agent for the plasticiser, and then applying heat and pressure to the treated fabric to effect coalescence of the strands and maintenance of the shape.

9. A lady's brassiere comprising a pair of separate breast cups each consisting of knitted molded fabric material composed of double-stranded thread of thermoplastic and non-thermoplastic material deformed and the strands fused to maintain such breast cup shape, a belt or back strap connecting said breast cups at their outer edges, an adjustable connection connecting the breast cups at their inner edges so that said breast cups can be positionally adjusted laterally and adjustable shoulder straps connecting the tops of the breast cups to the back of the connecting belt or back strap whereby the breast cups can be positioned vertically.

LAJOS BIHALY.

REFERENCES CITED

The following references are of record in the file of this patent:

UNITED STATES PATENTS

| Number | Name | Date |
|---|---|---|
| 590,842 | Kennedy | Sept. 28, 1887 |
| 623,413 | Murray | Apr. 18, 1899 |
| 1,884,560 | Cameron et al. | Oct. 25, 1932 |
| 1,903,960 | Dreyfus | Apr. 18, 1933 |
| 2,010,241 | Norman | Aug. 6, 1935 |
| 2,047,230 | Schneider | July 14, 1936 |
| 2,156,549 | Smith | May 2, 1939 |
| 2,177,425 | Barker | Oct. 24, 1939 |
| 2,190,807 | Steinberger | Feb. 20, 1940 |
| 2,253,000 | Francis, Jr. | Aug. 19, 1941 |
| 2,277,049 | Reed | Mar. 24, 1942 |
| 2,277,094 | Reed | Mar. 24, 1942 |
| 2,285,967 | Hardy | June 9, 1942 |
| 2,304,989 | Snowdon | Dec. 15, 1942 |
| 2,308,593 | Brew | Jan. 19, 1943 |
| 2,332,738 | Meade | Oct. 26, 1943 |
| 2,357,392 | Francis, Jr. | Sept. 5, 1944 |